Oct. 15, 1935.        A. S. HOWELL         2,017,249
                   PHOTOGRAPHIC CAMERA
              Filed May 29, 1933      11 Sheets-Sheet 1
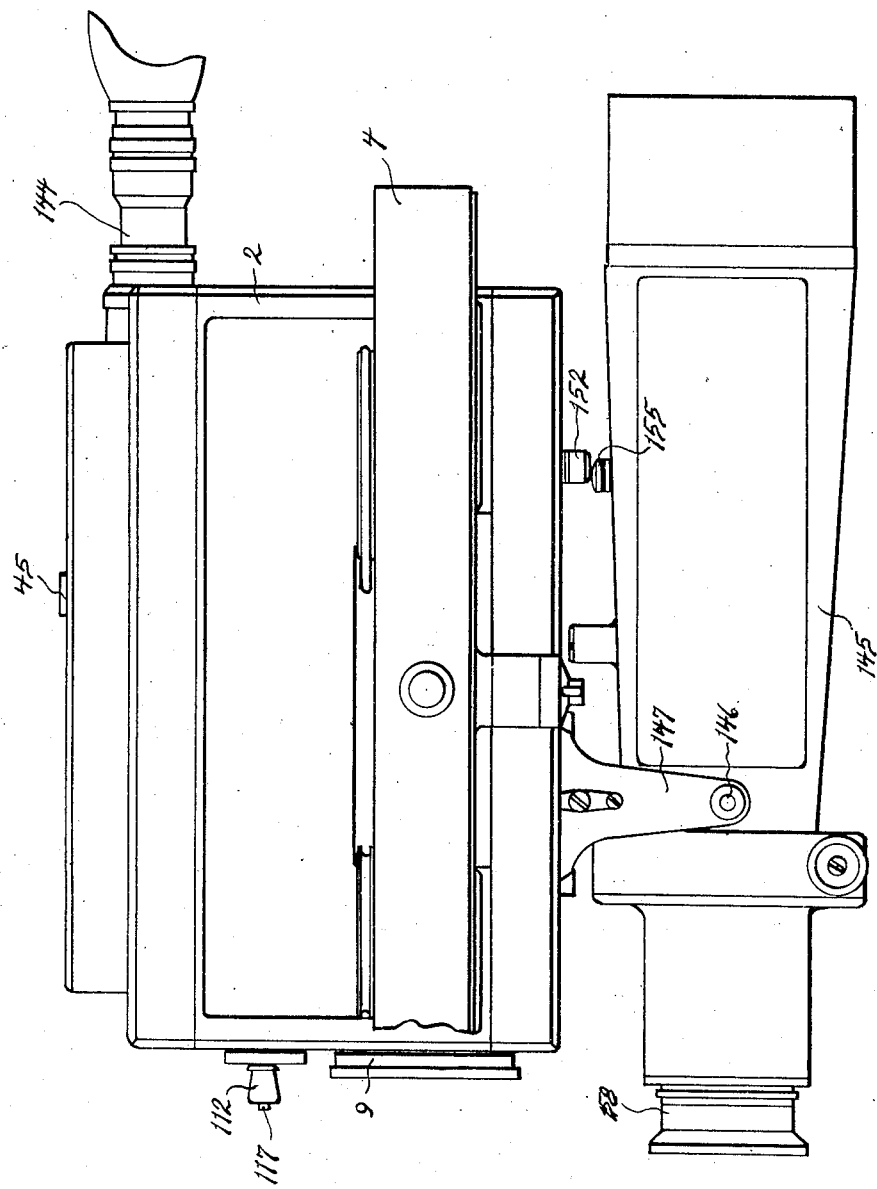
Inventor,
Albert S. Howell
By Robert F. Miehle
Atty.

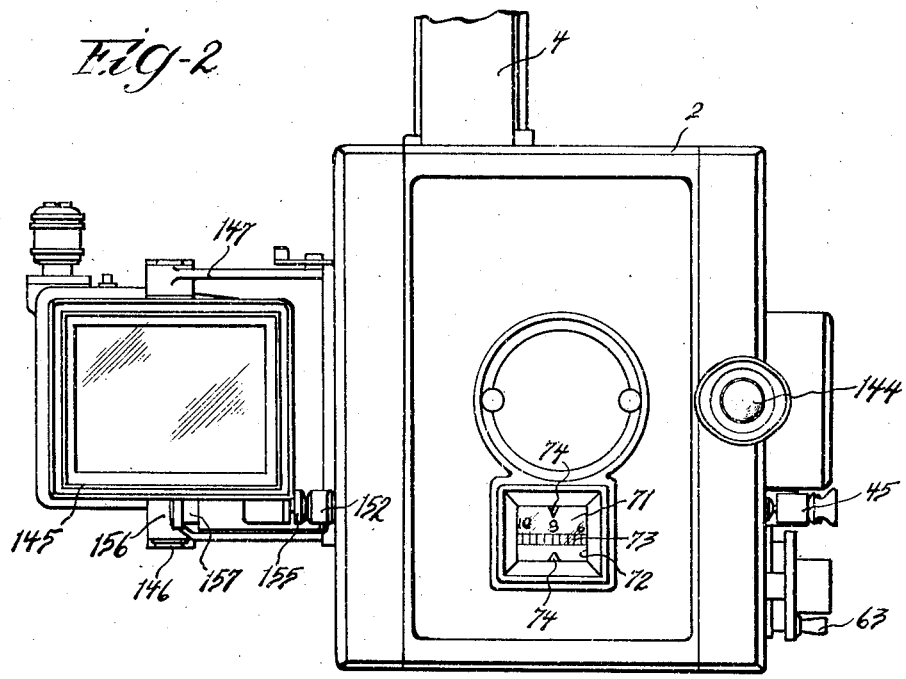

Oct. 15, 1935.  A. S. HOWELL  2,017,249
PHOTOGRAPHIC CAMERA
Filed May 29, 1933  11 Sheets-Sheet 3
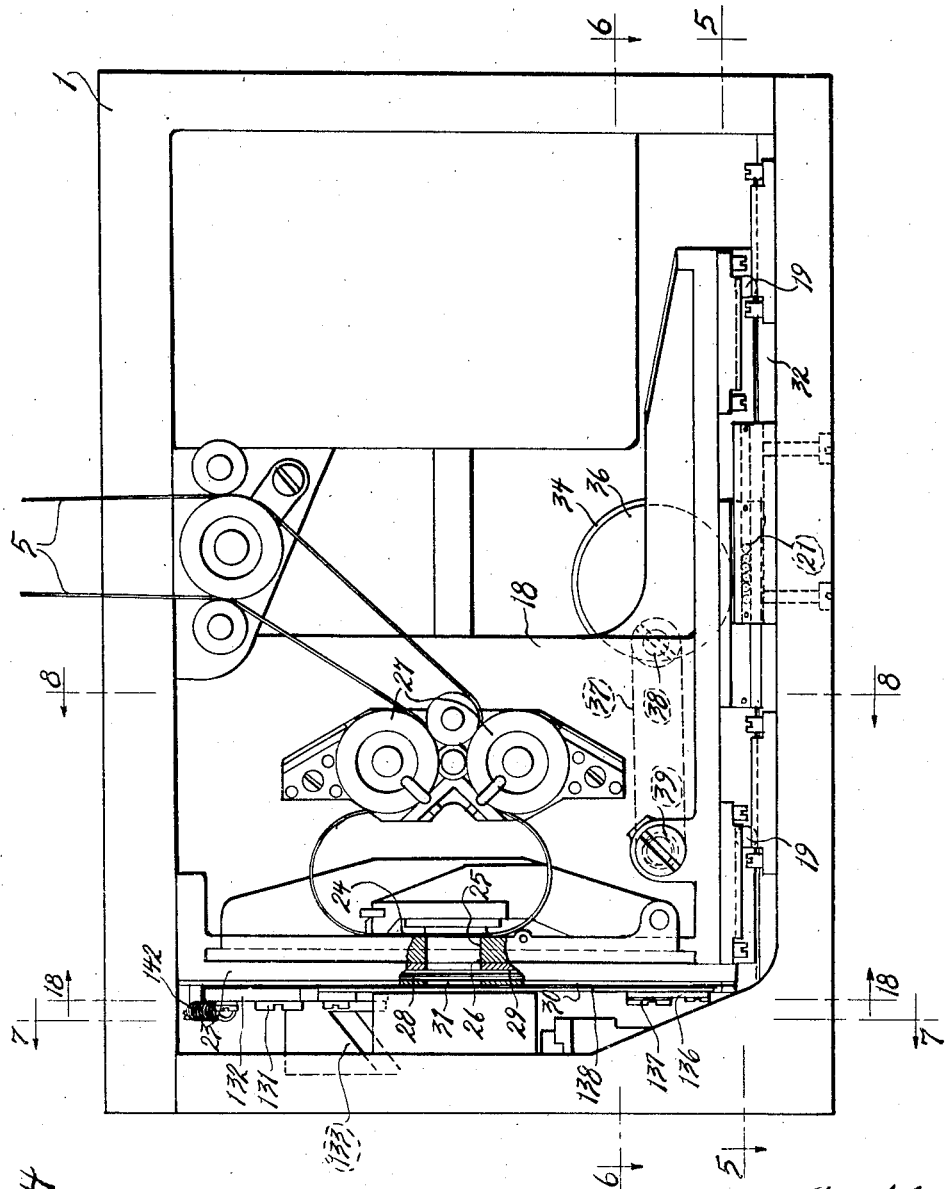
Inventor.
Albert S. Howell.
By: Robert F. Miehle,
Atty.

Oct. 15, 1935.  A. S. HOWELL  2,017,249
PHOTOGRAPHIC CAMERA
Filed May 29, 1933   11 Sheets-Sheet 4
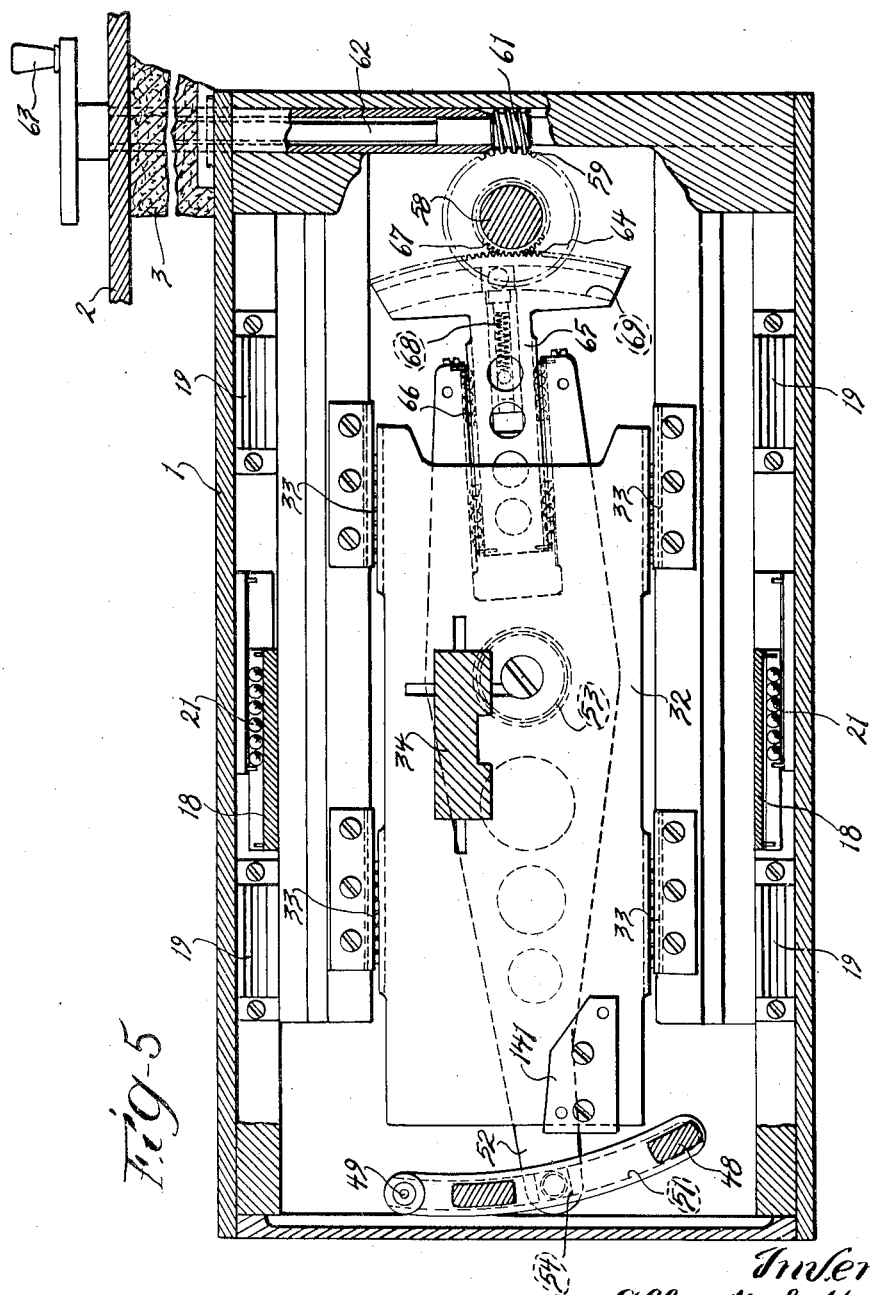

Oct. 15, 1935.  A. S. HOWELL  2,017,249
PHOTOGRAPHIC CAMERA
Filed May 29, 1933   11 Sheets-Sheet 5
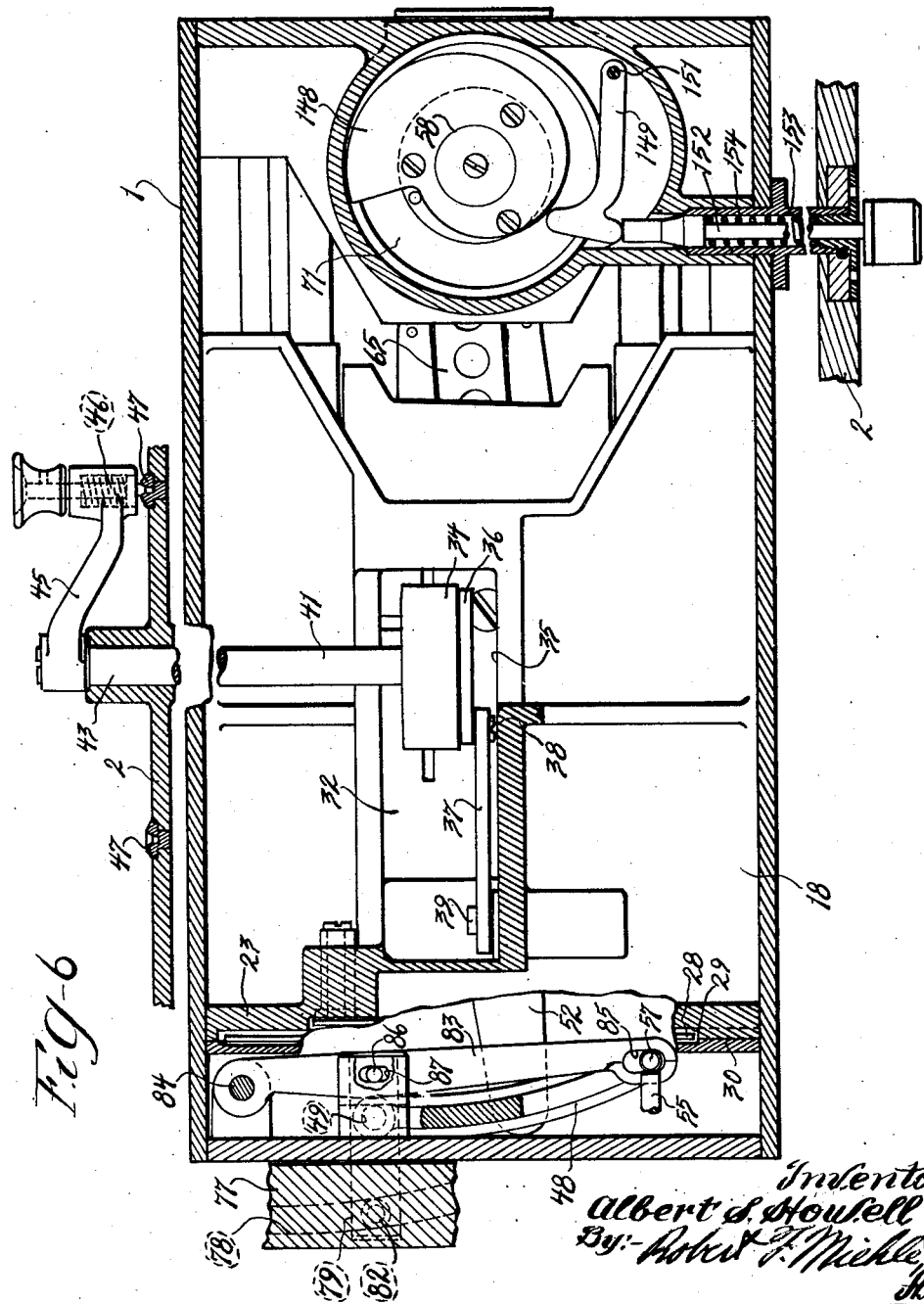

Oct. 15, 1935.  A. S. HOWELL  2,017,249
PHOTOGRAPHIC CAMERA
Filed May 29, 1933   11 Sheets-Sheet 6
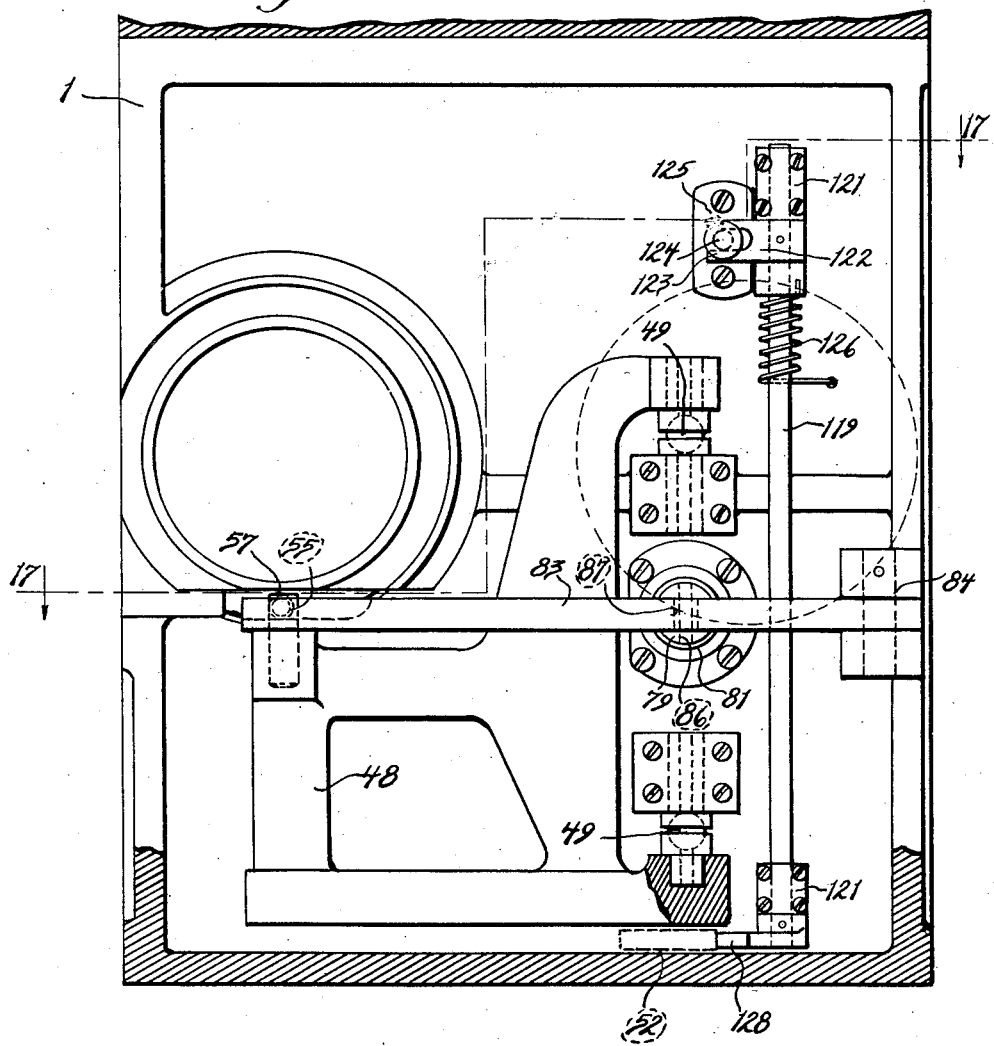

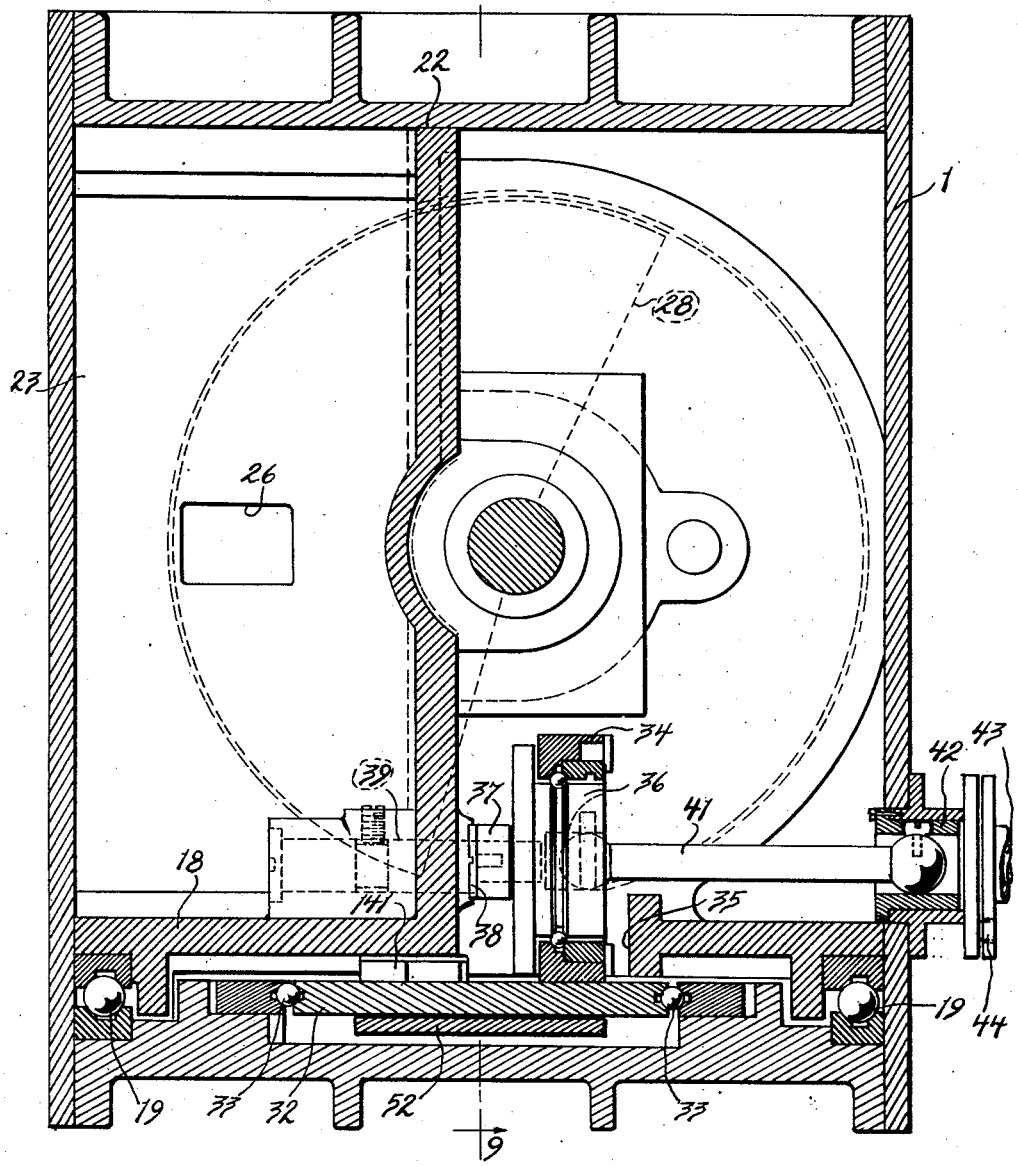

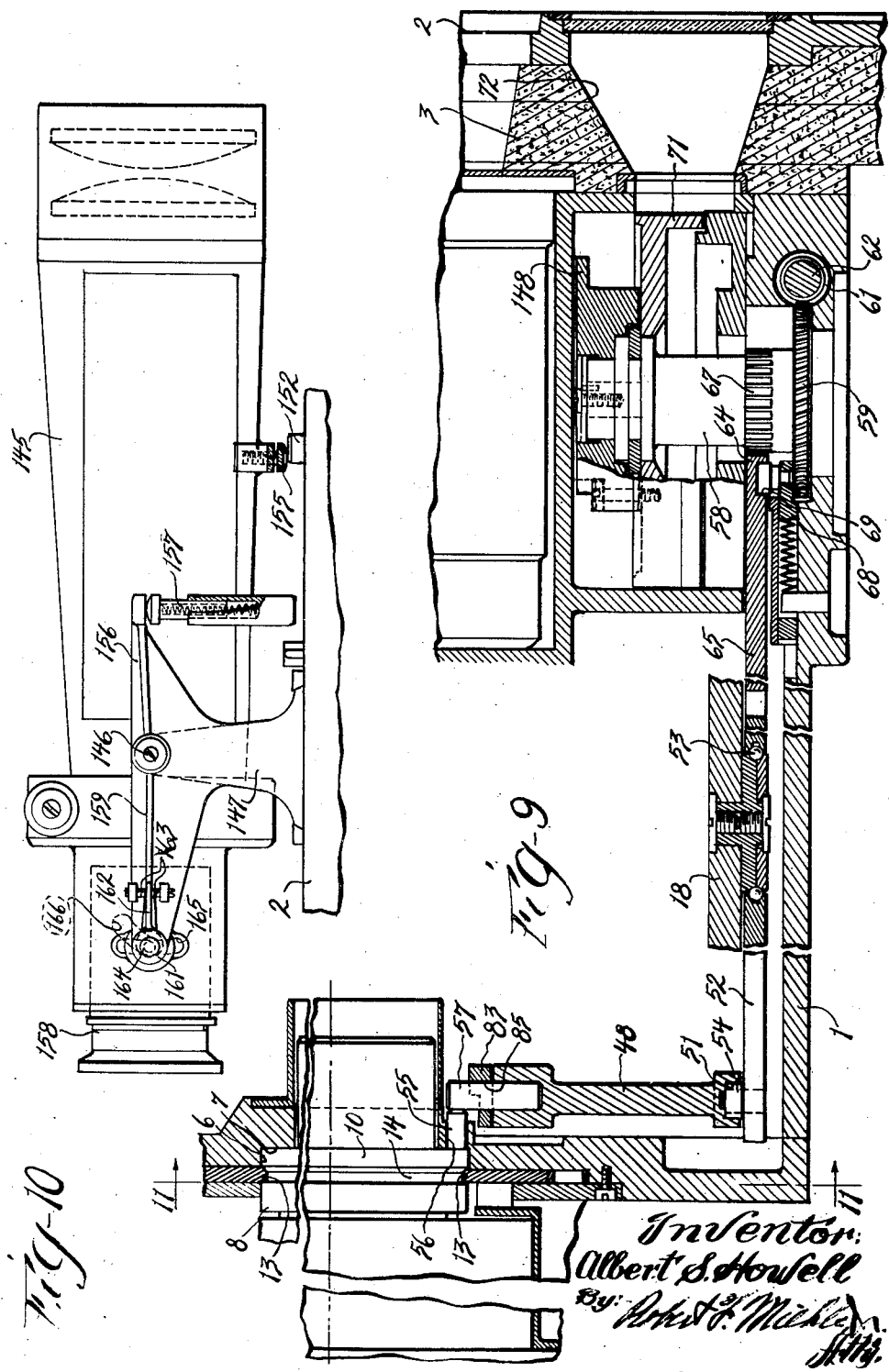

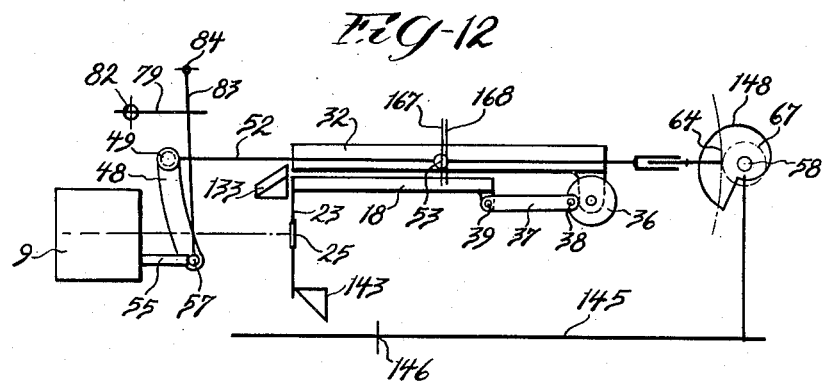
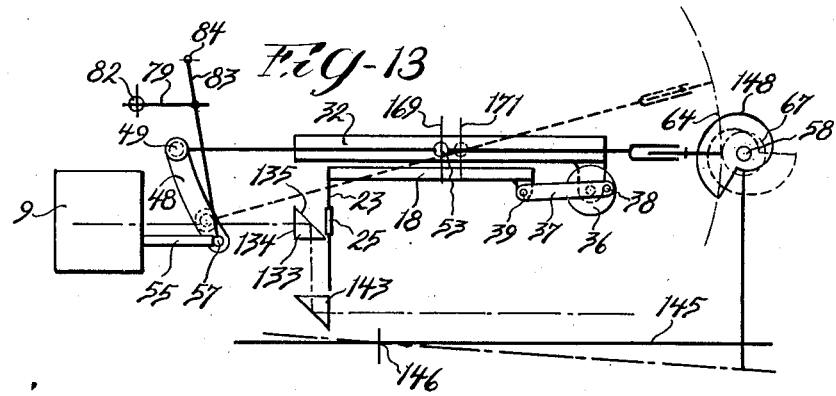
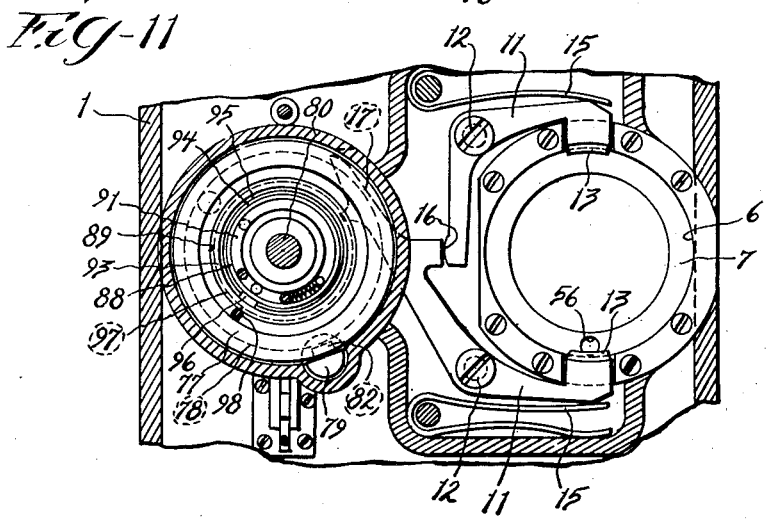

Oct. 15, 1935.    A. S. HOWELL    2,017,249
PHOTOGRAPHIC CAMERA
Filed May 29, 1933    11 Sheets-Sheet 10
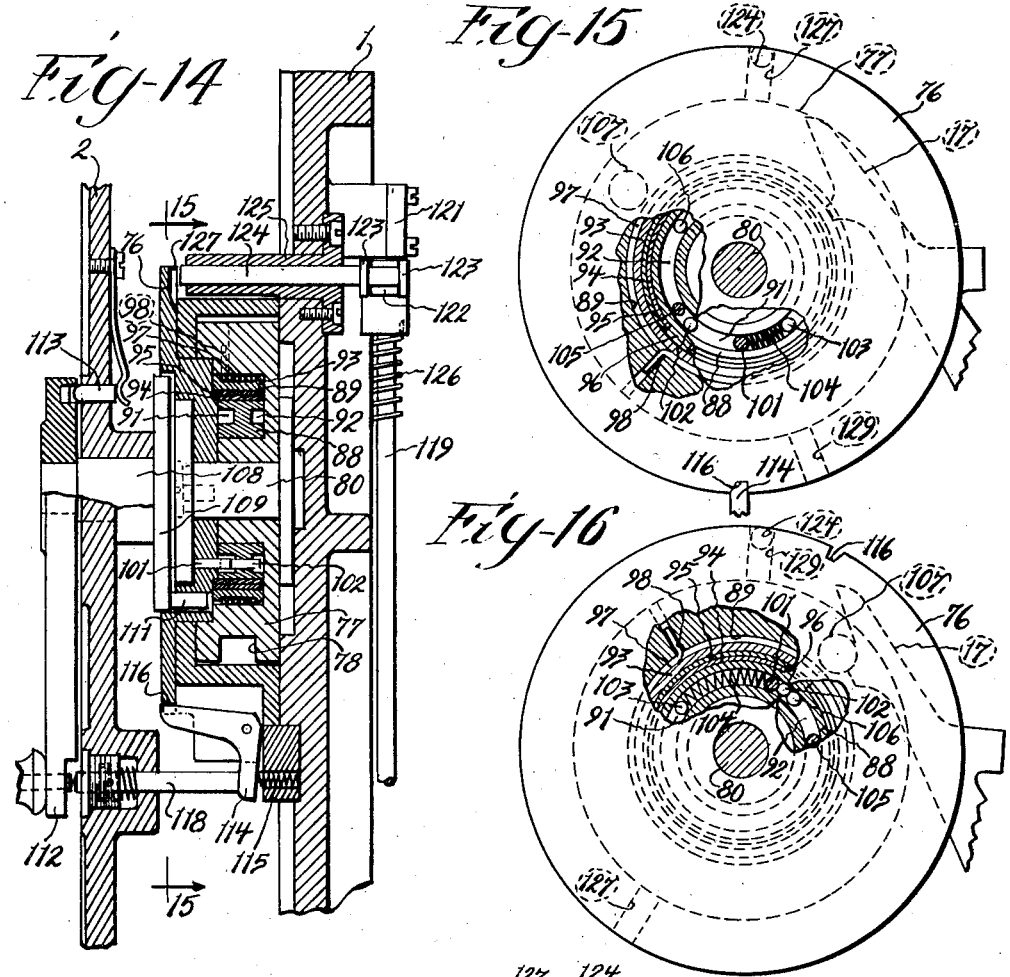
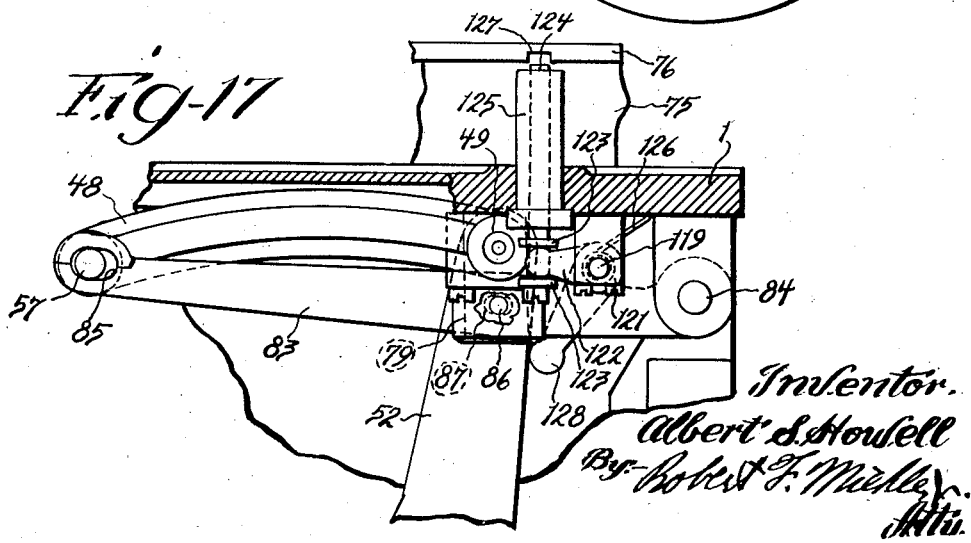

Oct. 15, 1935.  A. S. HOWELL  2,017,249
PHOTOGRAPHIC CAMERA
Filed May 29, 1933   11 Sheets-Sheet 11
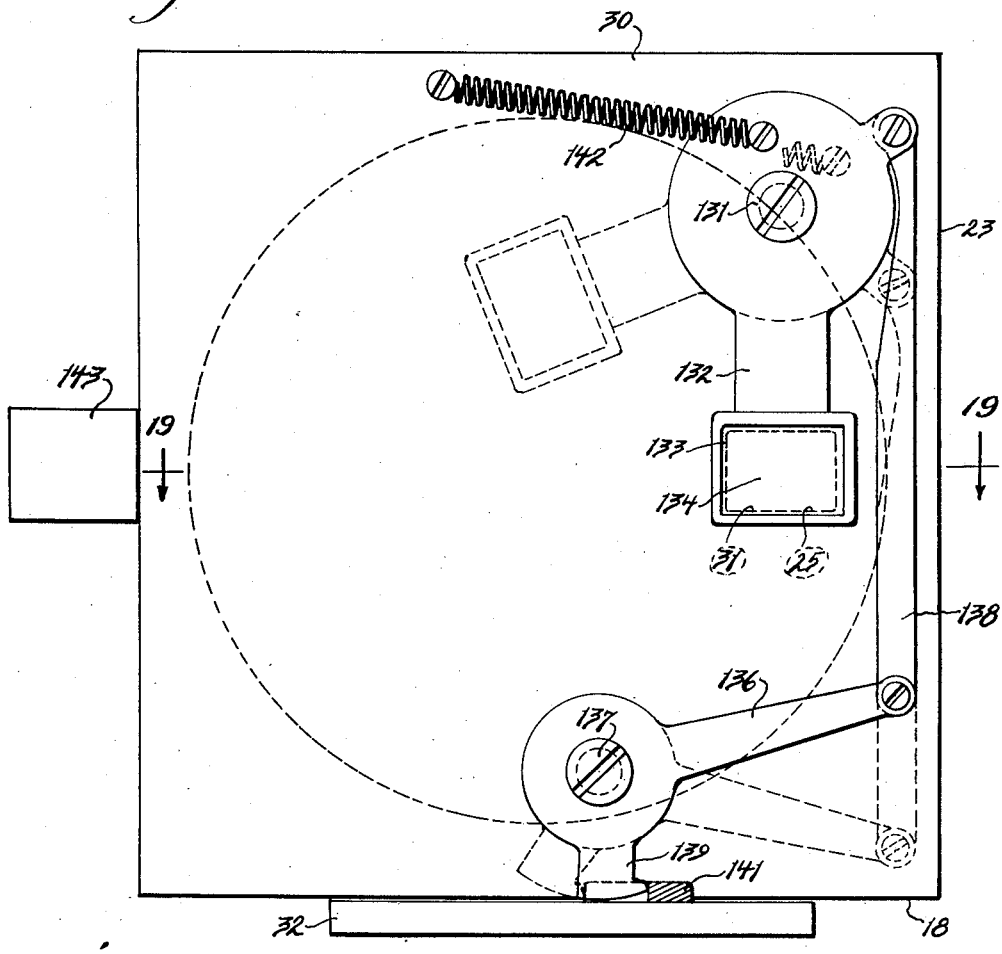
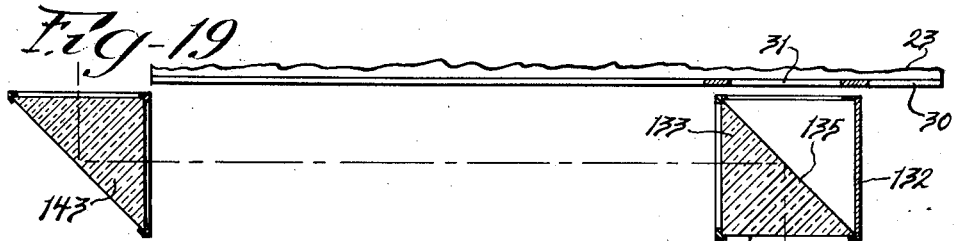

Patented Oct. 15, 1935

2,017,249

UNITED STATES PATENT OFFICE 2,017,249

PHOTOGRAPHIC CAMERA

Albert S. Howell, Chicago, Ill., assignor to The Bell & Howell Company, Chicago, Ill., a corporation of Illinois Application May 29, 1933, Serial No. 673,416

22 Claims. (Cl. 95—44)

My invention relates particularly to motion picture cameras although not limited to this use alone, and contemplates the selective use of photographic lenses of different focal lengths.

It is the general object of my invention to provide novel structure for the accurate and convenient focusing of a selected photographic lens, the invention contemplating a focusing mechanism which is adjusted automatically with the positioning of a selected photographic lens in photographing position to correspond with the focusing characteristics of the selected lens, all with a view toward the adjustment of any selected lens with a fixed range of movement of a focusing member and a single indexing scale associated therewith, the invention also contemplating the focusing and adjustment of a view finder for parallax with the focusing of the selected photographic lens.

Another object of my invention resides in the provision of a novel and convenient structure by which the photographic field of a selected photographic lens may be viewed through the photographic lens for accurately viewing the objective field and focusing the lens.

With these objects in view my invention consists in certain features of novelty in the construction, combination, and arrangement of parts by which the said objects and certain other objects, hereinafter appearing, are effected, all as fully described with reference to the accompanying drawings and more particularly pointed out in the appended claims.

In the said drawings—

Figure 1 is a top plan view of a motion picture camera embodying my invention;

Figure 2 is a partial rear elevation of the same;

Figure 3 is a partial front elevation of the same;

Figure 4 is an interior view of the same taken on the line 4—4 of Figure 3 and having parts broken away and shown in section;

Figure 5 is a partial sectional view taken substantially on the line 5—5 of Figure 4;

Figure 6 is a partial sectional view taken substantially on the line 6—6 of Figure 4;

Figure 7 is a partial sectional view taken substantially on the line 7—7 of Figure 4;

Figure 8 is a partial sectional view taken substantially on the line 8—8 of Figure 4, and having the intermittent film feed guide exposure apertured structure of the camera removed;

Figure 9 is a partial sectional view taken substantially on the line 9—9 of Figure 8;

Figure 10 is a bottom plan view of the view finder of the camera;

Figure 11 is a partial sectional view taken substantially on the line 11—11 of Figure 9;

Figures 12 and 13 are diagrammatic views of portions of the mechanism showing the same in different positions;

Figure 14 is a partial sectional view taken substantially on the line 14—14 of Figure 3;

Figures 15 and 16 are partial views taken substantially on the line 15—15 of Figure 14 and having parts broken away and shown in section and showing the parts in different positions of their movement;

Figure 17 is a partial sectional view taken substantially on the line 17—17 of Figure 7;

Figure 18 is a partial sectional view taken substantially on the line 18—18 of Figure 4; and Figure 19 is a partial sectional view substantially on the line 19—19 of Figure 18.

Like characters of reference indicate like parts in the several views.

Referring to the drawings, the body of the camera comprises an inner casing 1 and an outer casing 2 secured with the inner casing in a suitable manner, sound proofing material 3 being interposed between the inner and outer casings. See Figures 1, 5, 6, 9 and 14. The inner casing 1 carries the major part of the camera mechanism and the outer casing 2 carries, on the top thereof, a usual film magazine 4 communicating with the interior of the inner casing in a usual manner for the passage of a film 5, see Figure 4, from the magazine into the inner casing for exposure and from the inner casing into the magazine after exposure, as is usual.

The front wall of the inner casing 1 is provided with shouldered circular lens aperture 6, having a forwardly facing shoulder 7, in which photographic lenses of different focal lengths and having standardized mountings may be interchangeably seated, the outer casing 2 being suitably apertured for the reception of the lenses. See Figures 9 and 11.

The standardized lens mounting consists of a barrel 8, see Figures 9 and 11, within which a photographic lens 9, see Figure 3, is fixed, and the barrel 8 terminates rearwardly in a cylindrical portion 10 engaging the aperture 6 and engaging rearwardly against the shoulder 7 to position the mounting and lens axially.

The lens mounting is releasably secured in the aperture 6 abutting the shoulder 7 by means of two levers 11 intermediately pivoted at vertically spaced points on the inner casing 1, as designated at 12, see Figures 9 and 11, and having clutch formations 13 at ends thereof disposed in diametrically opposite relation with the aperture 6 and projecting through lateral openings of this aperture to engage in a circumferential groove 14 on the portion 10 of the barrel 8 to lock the selected photographic lens in the aperture 6 with the portion 10 engaged against the shoulder 7 to axially position the lens. Springs 15 yieldably urge the levers 11 and normally maintain the same in position locking a lens mount in the seat.

The other end portions of the levers 11 extend toward each other and have an abutting engagement 16 whereby movement of the lower lever in the disengaging direction causes both levers to simultaneously move into position with the clutch formations 13 withdrawn from the aperture 5 for the interchange of lenses, the springs 15 operating the levers into groove engaging position. The said other end portion of the lower lever 13 is extended diagonally upward from the abutting engagement 16, as designated at 17, for actuation of the levers as hereinafter described.

Thus are different photographic lenses interchangeably seated in photographing position on the inner casing 1.

A frame member 18 is disposed within the inner casing 1 and is mounted for movement, parallel with the focal axis of the camera, with respect to this casing by means of downward thrust ball bearings 19, opposing side thrust ball bearings 21, and an upward thrust slide bearing engagement of the member 18 with the top wall of this casing, as designated at 22, see Figures 4, 5 and 8.

The member 18 is provided at its forward end with a transverse vertical portion 23 with which is associated a similarly disposed intermittent film feed guide 24, see Figure 4, provided with an exposure aperture 25 alined with the focal axis of the camera, the portion 23 being also provided with a light aperture 26 continuing the aperture 25 forwardly for the passage of light from the photographic lens to the film in the guide at the exposure aperture 25.

In operation the film 4 is fed to and from the magazine 4 and to and from the exposure guide 24 by constant feed sprockets 27 which, carried with the member 18, are driven in timed relation with an intermittent film feed mechanism, not shown, and carried with the member 18, which intermittently feeds the film through the guide 24, a segmental light shutter 28, see Figures 4 and 6, carried with the member 18 in a recess 29 in the forward face of the portion 23 and covered by a plate 30 secured on the portion 23 and apertured in alinement with the exposure aperture 25, as designated at 31, being operated in timed relation with the intermittent feed mechanism to cut off the exposure light from the film during its feed periods in the guide as is usual for the exposure of successive portions of the film in the photographing of motion pictures.

Thus, it will be observed that the member 18 carries the focal or exposure plane structure of the camera, and the movement of the member 18 parallel with the focal axis relative to the casing 1 and the photographing lens is utilized for focusing the lens as well as for another purpose as will hereinafter appear.

Disposed within the casing 1 below the member 18 is a horizontally disposed elongated forwardly and rearwardly extending plate 32 and this plate is mounted on the casing 1 for forward and rearward movement parallel with the focal axis of the camera and independently of the member 18 by means of opposing ball bearings 33. See Figures 5 and 8.

Secured on the plate 32 intermediately thereof is a bored bracket 34 which extends upwardly through an opening 35 in the member 18 and has a member 36 rotatably mounted in a bore therethrough on a horizontal transverse axis, see Figures 6 and 8. A connecting bar 37 has one end engaged for rotation on a crank stud 38 on the member 36 and has its other end pivotally connected with the member 18 by means of an adjustable eccentric stud 39.

Positioning of the crank stud 38 in its opposite positions in the horizontal plane of the member 36 by angular movement of the member 36 causes the positioning of the member 18 in either of two predetermined positions in its movement relative to the plate 32, the forward or photographing position of the member 18 being that in which the crank stud 38 is in its forward position and the rearward position of the member 18 relative to the plate 32, assumed when the crank stud 38 is in its rearward position, being utilized for viewing through the photographic lens as hereinafter described.

The member 36 is controlled from the exterior of the camera by a Cardan shaft structure, generally designated at 41, operatively connecting the member 36 with a revoluble structure 42 engaged for rotation in a bore through the side of the inner casing 1, see Figures 6 and 8, a shaft 43 rotatably mounted in a bore through the outer casing 2 in alinement with the structure 42 and operatively connected therewith, as designated at 44, and a crank handle 45 secured on the shaft 43 exterior of the casing 2 and provided with a manually releasable spring latch device 46 engageable with either of two latch members 47 on the exterior of the casing 2 to predeterminately position the member 36 with the crank stud 38 either at its forward or its rearward position, the Cardan shaft structure 41 permitting forward and rearward movement of the plate 32 and with it the member 18 connected thereto by the connecting bar 37.

A cam member 48 is disposed in the casing 1 adjacent the front wall thereof and forward of the member 18, and is pivotally mounted by means of bearings 49 on a vertical axis normal to the movement of the member 18 and plate 32 and disposed to one side of the focal axis of the camera. See Figures 4, 6, 7, 9 and 17. The lower portion of the cam member 48 extends transversely below the lens mounting and is provided with a downwardly facing arcual cam groove 51 having its axis disposed rearwardly therefrom and extending transversely of the pivotal movement of the cam member, the cam groove, as shown, intersecting the pivotal axis of the cam member.

A rearwardly and forwardly extending lever 52 is disposed in the casing 1 between the bottom wall thereof and the plate 32, and is pivotally mounted at the intermediate portion thereof on the plate 32 on an axis normal to the movement of the member 18 and plate 32 and parallel to the pivotal axis of the cam member 48, as designated at 53. See Figures 5, 8 and 9.

A slide block 54 is pivotally mounted on the forward end of the lever 52 and is slidably engaged in the groove 51 of the cam member 48 for movement lineally thereof with pivotal movement of the lever 52. In a forward position of the cam member 48, its pivotal axis is coincident with the pivotal axis of the lever 52. When, however, the cam member is positioned rearwardly of the said forward position, pivotal movement of the lever 52 effects rearward and forward movement of the plate 32 and member 18, carrying the focal plane structure of the camera, relative to the casing 1 and the photographic lens fixed therewith for focusing the photographic lens, the infinity position being that in which the pivotal axis of the slide block 54 coincides with the pivotal axis of the cam member 48.

As the cam member 48 is adjusted rearwardly the movement between the photographic lens and the focal plane structure for a given movement of the lever 52 is increased, and it is by adjusting of the position of the cam member 48 in correspondence with the focusing characteristics of a selected photographic lens that the focusing movement, effected by the lever 52, is corresponded with the selected lens, the cam member 48 being predeterminately adjusted in correspondence with a selected lens in the following manner.

Each barrel 8 carrying a photographic lens is provided with a rearwardly extending metering stud 55 whose length corresponds with and is individual to the range of focusing movement of the photographic lens mounted in the barrel. That is to say, a barrel, carrying a lens of relatively short focal length, is provided with a relatively short stud, whereas a barrel, carrying a lens of relatively long focal length, is provided with a relatively long stud.

When a barrel 8 is seated in the predetermined axial position in the shouldered aperture 6 of the casing 1, see Figure 9, the stud 55 of the barrel projects rearwardly into the interior of the casing 1 through an opening 56 through the lens seat structure. The free end of the cam member 48, disposed below the lens seat structure, is provided with an upwardly projecting stud 57 whose upper end is disposed to forwardly abut the rear end of a stud 55 of a barrel 8 seated on the casing 1 to predeterminately position the cam member 48 in correspondence with the focusing characteristics of the photographic lens carried by the barrel 8 seated on the casing 1, the cam member 48 being positioned with the stud 57 abutting the stud 55 in a manner hereinafter described, so that the given movement of the lever 52, which may be termed the focusing lever, effects the proper focusing movement of the selected photographic lens due to the length of the stud 55 which is individual to the selected lens.

The lever 52 is actuated from the exterior of the camera in the following manner. See Figures 5 and 9.

Mounted for rotation on and within the casing 1 adjacent the rear end of the casing, is a revoluble member 58 disposed on a vertical axis which is parallel to the pivotal axis of the focusing lever 52. The member 58 is provided adjacent its lower end with a worm wheel 59 which meshes with a worm 61 fixed on a transverse shaft structure 62 journaled on the casings 1 and 2 and provided with a crank handle 63 on the exterior of the casing 2 whereby the member 58 may be angularly adjusted from the exterior of the camera.

A spur gear segment 64 is provided with an internal radial arm 65 which is mounted on the rear portion of the focusing lever 52 for sliding movement radially of the lever 52 by means of ball slide bearings 66. The gear segment 64 is yieldably urged rearwardly to maintain it in mesh with a spur gear 67 formed on the member 58 by means of a spring device 68 slidably engaging in an angular groove 69 on the gear segment 64.

Accordingly, angular movement of the member 58 effects pivotal movement of the focusing lever 52 for focusing the selected photographic lens, the sliding engagement between the gear segment 64 and the focusing lever 52 permitting forward and rearward movement of the lever 52 with the plate 32 and member 18.

The member 58 is provided with a cylindrical dial 71 which is visible through an opening 72 at the rear of the camera, see Figures 2 and 9, and this dial is provided with a focusing scale 73 cooperating with pointers 74 associated with the opening 72 for predeterminately adjusting the lens focus, the scale serving for all lenses by reason of the adjustment of the cam member 48 for the selected lens, as hereinbefore described.

In order to facilitate the interchange of lenses of different focal length on the camera, the following is provided.

Secured on the front face of the front wall of the casing 1, is a circular casing member 75 forming an enclosure with the front wall of this casing. See Figures 11, 14, 15 and 16. Rotatably mounted in an axial opening in the front wall of the casing member 75 is a shouldered disc 76, and a short shaft 80 is secured on the front face of the front wall of the casing 1 in concentric relation with the disc 76 and engages in an axial bore through the disc 76 for relative rotation therewith.

An axially bored cam member 77 within the casing member 75 is rotatably mounted on the shaft 76, and is provided with a peripherally extending cam groove 78. See Figures 6, 11 and 14. A forwardly and rearwardly extending draw bolt 79 is mounted for sliding movement in a bearing 81 on the front wall of the casing 1 and is provided at its front end with a roller stud 82 engaged in the cam groove 78 for actuation of the draw bolt with angular movement of the cam member 77. See also Figure 7.

A horizontally disposed lever 83 extends transversely of the casing 1 immediately to the rear of the front wall thereof and has one end thereof pivoted on a vertical axis, as designated at 84, on the casing 1 at the side thereof adjacent the cam member 77. See Figures 6, 7 and 17. The free end of the lever 83 is provided with a longitudinally elongated aperture 85 which is engaged for pivotal and sliding movement on the stud 57 of the cam member 48, whereby the lever 83 is operatively connected with the cam member 48 for actuation thereof.

The rear portion of the draw bolt 79 is diametrically slotted and embraces the lever 83 between the ends thereof and is operatively connected with this lever by means of a vertical pin 86 mounted on the slotted portion of the draw bolt 60 and engaging in an aperture 87 through the lever.

Thus, the angular movement of the cam 77 effects pivotal movement of the cam member 48 for purposes hereinafter appearing.

An annular member 88 is mounted in a forwardly facing concentric groove 89 in the forward face of the cam member 77 for angular movement with respect thereto, see Figure 14, and is provided with a concentric groove 91 in its forward face and with a second concentric groove 92 in its rearward face.

A cylindrical ring 93 is also disposed in the concentric groove 89 for angular movement with respect to the cam member 77, and is disposed in surrounding spaced relation with the annular member 88. See Figures 14, 15 and 16. A split spring ring 94 surrounds the annular member 88 and a split friction ring 95 surrounds the ring 94 and is maintained in frictional engagement with the bore of the ring 93 by the spring ring 94. The annular member 88 is provided with an external radial lug 96 which extends between the ends of the split rings 94 and 95 to angularly fix these rings with the annular member 88, thus completing a frictional slip drive connection between the annular member 88 and the ring 93.

A spring brake coil 97 is engaged in a shallow circumferential groove on the ring 93, and has one end secured, as designated at 98, with the cam member 77 to form an over running driving connection between the cam member 77 and the ring 93. Accordingly, angular movement of the annular member 88 in a counter clockwise direction in Figures 15 and 16 serves to actuate the cam member 77 in the corresponding direction through the friction slip driving and the over running clutch connections, which are arranged in series, while angular movement of the annular member 88 in the opposite direction does not actuate the cam member due to the release of the over running clutch.

The disc 76 is provided with a stud 101 which projects inwardly into the groove 91 of the annular member 88, and the annular member is provided with a stud 102 projecting into both of the grooves 91 and 92 and the forward end of which abuts the stud 101 to actuate the annular member 88 from the disc 76 in a clockwise direction in Figures 15 and 16. The annular member 88 is provided with a second stud 103 projecting forwardly in the groove 91 and angularly spaced from the stud 102, and, the stud 101 being disposed between the studs 102 and 103, a compression spring 104 is arranged in the groove 91 between the pins 101 and 103 and abuts the same to provide a yielding drive connection between the disc 76 and the annular member 88 for actuating the annular member with movement of the disc in a counter clockwise direction in Figures 15 and 16, which direction, it will be noted, is the direction in which the annular member 88 actuates the cam member 77 through the friction slip connection and the over running clutch above described, the spring 104, the friction slip connection and the over running clutch acting in series.

The disc 76 is provided with another stud 105 angular spaced from the stud 101 which projects into the groove 91 for engagement with the stud 102 to limit separating movement of the studs 101 and 102.

As previously stated the stud 102 also projects rearwardly into the groove 92, and the cam member 77 is provided with a stud 106 which projects forwardly into the groove 92 for abutting engagement with the stud 102 to actuate the cam member 77 with clockwise movement of the annular member 88 in Figures 15 and 16.

The cam member 77 is provided with a rearwardly projecting stud 107 which is engageable with the extension 17 of the lower lens clutch lever 11 to move the lens clutch levers 11 into released position with final movement of the cam member 77 in the clockwise direction as shown in Figure 16.

A short shaft 108 is rotatably mounted in an extended bore through the front wall of the casing 2 in axial alinement with the shaft 88, see Figures 3 and 14, and is provided at its rear end with a disc 109 which is provided with a crank stud 111 engaging in an aperture in the disc 76 to effect angular movement of the disc with angular movement of this shaft.

A hand crank 112 is secured on the shaft 108 exterior of the casing 2 for manual actuation of the shaft, a releasing spring detent, generally designated at 113, serving to locate the crank handle at the extremes of its movement. See Figure 14.

When the hand crank 112 is in its downwardly extending position, as shown in Figures 3 and 14, the related parts are in the position shown in Figures 11 and 15, in which the lens clutch levers 13 are in position securing a photographic lens 1 in the lens seat and with the cam member 48 maintained forwardly with the stud 57 thereof forwardly engaged against the metering stud 55 on the lens for setting the focusing movement to correspond with the focusing range of the lens.

In this lens locked position of the disc 76, a bell crank lever 114, pivoted on the casing member 75 and urged by a spring 115, is engaged in a notch 116 on the disc 76 to lock the disc in this position, and a push button 117 associated with the handle of the hand crank 112 operates upon the lever 114 through a spring plunger 118 on the casing 2 to release the disc 76 for angular movement. See Figures 1, 2 and 14.

Disposed immediately inward of the front wall of the casing 1, see Figures 7, 14 and 17, is a vertically disposed rock shaft 119 which is mounted on the front wall of this casing by means of bearings 121. An arm 122 is secured on the shaft 119 adjacent its upper end, and has its free end engaged between spaced collars 123 of a forwardly and rearwardly extending plunger 124 slidably mounted in a bearing 125 on the front wall of the casing 1.

A torsion spring 126 on the shaft 119 serves to urge the plunger 124 forwardly and engage the forward end of this plunger in a rearwardly facing notch 127 on the disc 76 to lock the disc in its lens locked position as above described.

An arm 128 is secured on the lower end of the shaft 119 and has its free end disposed for engagement by the forward end of the focusing lever 52, see Figure 17, when the lever 52 is moved into its infinity position, in which the pivotal axis of the slide block 54 coincides with the pivotal axis of the cam member 48, to actuate the shaft 119 to withdraw the plunger 124 from engagement with the notch 127 to permit movement of the disc 76 out of its lens locked position.

When it is desired to interchange photographic lenses, the focusing lever 52 is moved to its infinity position to release the disc 76 from the plunger 124. Then the push button 117 of the hand crank 112 is pushed inwardly to release the disc 76 from the lever 114, and the disc is moved, by means of the hand crank 112, in a clockwise direction in Figure 15 which shows the lens locked or photographing position of the parts.

This movement first causes the stud 101 to move away from the stud 103, the spring 104 expanding accordingly, until the stud 101 abuts the stud 102, whereupon the annular member 88 is moved with the disc 76. No movement in this direction is transmitted from the member 88 to the member 77 through the over running clutch comprising the spring brake coil 97, so that the member 88 is moved with the disc 76 until the stud 102 abuts the stud 106, whereupon the cam member 77 is moved with the member 88 and disc 76.

Upon continued movement in the same direction the cam groove 78 effects rearward movement of the draw bolt 79 which effects rearward pivotal movement of the lever 83 and with it the cam member 48 into its extreme rearward position separating the stud 57 of the cam member 48 from the metering stud 55 of the mounted lens. Final clockwise movement of the stud 107 member 77 causes engagement of the stud 107 with the portion 17 of the lower lens clutch lever 11 and actuation thereof to release the mounted lens, the parts being then in the position shown in Figure 16. The disc 76 is provided with a rearwardly facing notch 128, see Figure 16, which alines with the plunger 124 in the lens unlocked position of the disc 76 for engagement by the plunger 124 to lock the disc in this position in case the focusing lever 52 is moved out of infinity position in this position of the disc, thus requiring the positioning of the focusing lever in infinity position before a lens can be locked in the lens seat.

The parts being in the lens unlocked position shown in Figure 16 and the focusing lever 52 being in infinity position, the desired photographic lens is placed in the lens seat, the cam member 48 being in its extreme rearward position so that the stud 57 is not engaged by the metering stud 55 in the seating of the lens.

The lens being held against the lens seat, the hand crank 112 is moved counter clockwise in Figure 16. Movement in this direction is transmitted from the disc 76 to the member 88 from the stud 101 to the stud 103 through the spring 104 and this movement of the member 88 is transmitted to the cam member 77 through the friction slip connection and the overrunning clutch before described. Initial movement of the cam member 77 in this direction causes disengagement of the stud 107 from the portion 17 of the lower lens lock lever 11 to lock the lens in the seat, and continued movement in this direction causes the cam groove 78 of the cam member 77 to move the draw bolt forwardly and with it the cam member 48 until the stud 57 of the cam member 48 engages the metering stud 55 to position the cam member 48 correspondingly with the focusing range of the lens.

When the cam member 48 is so positioned, further movement of the hand crank 112 causes compression of the spring 104 and slippage of the friction slip device until the hand crank is in its lens locked position maintained by the detent device 113. In the lens locked position of the hand crank the spring 104 is under compression controlled by the friction slip device, so that the cam member 48 is maintained by pressure of the spring 104 in its adjusted position with the stud 57 abutting the metering stud 55 of the lens. The lens locked position of the parts is shown in Figure 15.

After the lens locking cycle of the parts is completed the selected photographic lens is focused by adjusting the focusing lever 52, reference being had to the scale 73 for predeterminate focusing, the arrangement being such that the scale 73 serves for predeterminately focusing the desired range of photographic lenses.

As before described the forward position of the focal plane carrying member 18 with reference to the plate 32 is the position in which the photographing is done, while the rearward position of the member 18 is utilized for direct viewing or focusing through the photographic lenses by means now to be described.

Mounted for pivotal movement on a forwardly and rearwardly extending axis, as designated at 131, on the front face of the plate 30, is an arm 132 on the free end of which is mounted a glass prism 133 of right angle isosceles triangle section having the face of one of the legs thereof, designated at 134, disposed normal to the focal axis of the camera and having the hypotenuse face thereof, designated at 135, disposed to the rear of the face 134. See Figures 18 and 19.

The prism 133 is movable with the arm 132 into and out of position alined with the focal axis of the camera and the exposure aperture 25 as shown in Figures 18 and 19. A second arm 136 is mounted for pivotal movement, as designated at 137, on the lower portion of the front face of the plate 30 and is operatively connected with the arm 132 by means of a connecting bar 138. The arm 136 is provided with a short downwardly projecting lug 139 which lies in the path of a forwardly and rearwardly extending cam 141 fixed on the upper face of the plate 32, see Figures 5 and 18. A spring 142, operative upon the arm 132, serves to move the arm 132 into position alining the prism 133 with the focal axis of the camera and to maintain the lug 139 in engagement with the cam 141, the arrangement being such that, in the rearward position of the member 18 with reference to the plate 32, the prism 133 is alined with the focal axis of the camera as shown in Figures 18 and 19, and in the forward or photographing position of the member 18 with reference to the plate 32, the prism 133 is positioned to one side of the focal axis, as shown in broken lines in Figure 18, this positioning of the prism 133 being accomplished automatically with the positioning of the member 18 with reference to the plate 32 through the co-operation of the cam 141 and spring 142.

A second glass prism 143 of right angle isosceles triangle section is carried with the casing 2 in such a position that the light from the photographic lens, which is reflected transversely by the prism 133 when in alinement with the focal axis of the camera, is reflected rearwardly from the hypotenuse face of the prism 143 through a conventional viewing structure, generally designated at 144 in Figures 1 and 2, thus providing for direct viewing through the photographic lens, the front face 134 of the prism 133 being a ground surface to form a translucent image fixing surface for fixing the image projected by the photographic lens for viewing.

The arrangement is such that in the forward position of the focal plane structure carrying member 18 with reference to the plate 32, the film plane at the exposure aperture 25 is positioned to form the focal plane of the camera, and in the rearward position of the member 18 with reference to the plate 32 the prism 133 is alined with the focal axis of the camera and the image fixing surface 134 thereof is positioned in this focal plane, so that focusing on the surface 134 effects focusing for photographing.

Thus, if it is desired to focus the photographic lens by direct viewing, the member 18 is moved to its rearward position with reference to the plate 32 by actuation of the crank handle 45, this operation positioning the prism 133 in alinement with the focal axis. The operator then focuses the photographic lens on the image fixing surface 134 of the prism 132 by actuating the crank handle 63 while viewing through the viewing structure 144 until the desired focus is attained. Then the crank handle 45 is oppositely actuated to position the member 18 forwardly with reference to the plate 32, whereupon the camera is ready for photographing.

A view finder, generally designated at 145, is pivotally mounted on a vertical axis, as designated at 146, by means of a bracket 147 secured on the side of the casing 2 adjacent the focal axis of the camera. See Figures 1, 2, 3 and 10. The axis of the view finder is disposed in the horizontal plane of the focal axis of the camera, so that pivotal movement of the view finder provides adjustment thereof for parallax.

A radial cam 148 is secured on the dial 71, and a rock lever 149 is pivoted on a vertical axis, as designated at 151, on the casing 1 is arranged in engaging relation with the cam 148. See Figure 6. A horizontal transversely disposed plunger 152 is mounted for sliding movement in a bearing structure 153 fixed with the casings 1 and 2, and is urged inwardly by a compression spring 154 to engage the rock lever 149 and maintain the rock lever in engagement with the cam 148 for actuation of the plunger by the cam.

The outer end of the plunger 152 projects exterior of the casing 2 and is disposed in abutting relation with an adjustable formation 155, see Figure 10, on the body of the view finder 145 rearwardly of the pivotal axis thereof. The lower portion of the bracket 147 is provided with a rearwardly projecting arm 156 which is abutted by a horizontal transversely disposed spring plunger device 157 yieldably urging the view finder in the direction to abut the formation 155 with the plunger 152.

Accordingly, the view finder is caused to follow, in its pivotal movement, the plunger 152 as actuated by the cam 148 in cooperation with the spring 154, so that the view finder is automatically adjusted for parallax with focusing adjustment of the camera.

The lens system of the view finder 145 is more or less conventional and is adapted to be focused by means of the front lens combination thereof, not shown, being mounted in a barrel 158 which is mounted for sliding movement in the front of the body of the view finder.

The lower portion of the bracket 147 is provided with a forwardly extending arm 159, and mounted for pivotal movement on the front of this arm on a vertical axis is member 161 provided with an arm 162 which is confined between adjusting screws 163 on the arm 159 for adjustably fixing the member 161 with the arm 159. The member 161 is provided with an upwardly projecting eccentrically disposed stud 164 which projects upwardly through a segmental opening 165 through the view finder body and slidably engages in a cam groove 166 in the barrel 158.

The barrel 158 is angularly fixed with the view finder body in an obvious manner unnecessary to be described, so that pivotal movement of the view finder effects adjustment of the barrel 158 with reference to the view finder body and focal adjustment of the view finder, the arrangement being such that focal adjustment of the view finder is automatically effected in correspondence with focusing of the photographic lens for different objective distances, the adjustment of the cam member 48 in correspondence with the focusing characteristics of the selected photographic lens also accommodating focusing and parallax adjustment of the view finder to correspond with the selected photographic lens.

Referring to Figures 12 and 13, Figure 12 shows the parts in position with a photographic lens of relatively short focal length mounted in the lens seat, in which the adjusting movement of the focusing lever 52 effects a relatively short movement of the plate 32 and focal plane structure carrying member 18, as indicated by the lines 167 and 168. In Figure 12 the relative position of the members 18 and 32 is that in which the photographing is accomplished.

Figure 13 shows the parts in position with a photographic lens of relatively long focal length mounted in the lens seat, in which the adjusting movement of the focusing lever 52 effects a relatively long movement of the plate 32 and focal plane structure carrying member 18, as indicated by the lines 169 and 171. In Figure 13 the relative position of the members 18 and 32 is that in which direct viewing is accomplished.

Having thus described my invention, I do not wish to be limited to the precise details described as changes may be readily made without departing from the spirit of my invention, but having thus described my invention, I claim as new and desire to secure by Letters Patent the following:

1. In a photographic camera the combination of two relatively movable members for effecting focusing adjustment of a selected photographic lens, a movable focusing member, means for effecting relative focusing movement of said two members with movement of said focusing member and adapted for adjustment to vary said relative focusing movement to correspond the same with lenses of different focusing characteristics, and means individual to the selected lens for adjusting said adjustable means to correspond to the focusing characteristics of the selected lens.

2. In a photographic camera the combination of two relatively movable members for effecting focusing adjustment of a selected photographic lens, of a movable focusing member, means for effecting relative focusing movement of said two members with movement of said focusing member and adapted to vary the amount of said relative movement with a predetermined range of movement of said focusing member to correspond the same with lenses of different focusing characteristics, and means individual to and associated with the selected lens for adjusting said adjustable means to correspond to the focusing characteristics of the selected lens.

3. In a photographic camera the combination of two relatively movable members for effecting focusing adjustment of an interchangeably mounted photographic lens fixed with one of said members with reference to said relative movement, of a movable focusing member, means for effecting relative focusing movement of said members with movement of said focusing member and adapted to vary said relative focusing movement to correspond the same with interchangeable lenses of different focusing characteristics, and means individual to and carried by the mounted photographic lens for adjusting said adjustable means to correspond to the focusing characteristics of this lens.

4. In a photographic camera the combination of two relatively movable members for effecting the focusing of a selected photographic lens, a movable focusing member, a focusing movement control member pivoted on an axis normal to the plane of movement of said focusing member, an operative connection between said focusing and control members whereby said focusing member is movable lineally of said control member for effecting relative focusing movement of said first mentioned two members, and means for predeterminately positioning said control member in its pivotal movement to correspond said relative focusing movement to the focusing characteristics of different photographic lenses.

5. In a photographic camera the combination of two relatively movable members for effecting the focusing of a selected photographic lens, a movable focusing member, a pivoted focusing control member disposed on an axis normal to the plane of movement of said focusing member, an operative connection between said focusing and control members comprising an arcual slide on said control member and disposed transverse to the pivotal movement the control member and having its axis disposed coincident with the pivotal axis of said adjusting member in one position of said control member and along which said adjusting member is movable for effecting relative focusing movement of said first mentioned two members, and means for predeterminately positioning said control member in its pivotal movement to correspond said relative focusing movement to the focusing characteristics of different lenses.

6. In a photographic camera the combination of two relatively movable members for effecting the focusing of a selected photographic lens, a focusing member pivotally mounted on one of said two members on an axis transverse to said relative movement, a focusing control member pivotally mounted on the other of said two members on an axis parallel to the axis of said focusing member, an operative connection between said focusing and control members comprising a slide on said control member disposed transverse to the pivotal movement of the control member and along which said focusing member is movable for effecting relative focusing movement of said first mentioned two members, and means for predeterminately positioning said control member in its pivotal movement to correspond said relative focusing movement to the focusing characteristics of different photographic lenses.

7. In a photographic camera the combination of a casing provided with means whereby a photographic lens is interchangeably carried thereby in a predetermined position relative thereto, a support member within said casing and carrying the focal plane structure of the camera and mounted for movement with reference to the casing along the focal axis of the camera for focusing the lens, of a movable focusing member, means or effecting focusing movement of said support member with movement of said focusing member and adapted for adjustment to vary the focusing movement of said support member to correspond the same with lenses of different focusing characteristics, and means individual to and carried by the selected lens for adjusting said adjustable means to correspond to the focusing characteristics of this lens.

8. In a phtotographic camera the combination of a photographic lens carrying member and a focal plane structure member, said members being relatively movable along the focal axis of the camera, means for effecting positioning of said members in either of two predetermined positions in said relative movement, a device for viewing through the photographic lens comprising a translucent image fixing surface and a cooperating angularly disposed reflecting surface at the rear thereof, and means whereby said surfaces are movable into and out of position alined with said focal axis and with said image fixing surface in the focal plane of the camera when said members are in their relative position of far separation.

9. In a photographic camera the combination of a photographic lens carrying casing and a focal plane structure member within the casing and mounted for movement relative to the casing along the focal axis of the camera, means for effecting positioning of said member in either of two predetermined positions in its said movement, a device for viewing through the photographic lens comprising a translucent image fixing surface and a cooperating angularly disposed reflecting surface at the rear thereof, and means whereby said surfaces are movable into and out of position alined with said focal axis and with said image fixing surface in the focal plane of the camera when said focal plane member is in the rearward of said positions thereof.

10. In a photographic camera the combination of a photographic lens carrying member and a focal plane structure member, said members being relatively movable along the focal axis of the camera, means for effecting positioning of said members in either of two predetermined positions in said relative movement, a device for viewing through the photographic lens comprising a translucent image fixing surface and a cooperating angularly disposed reflecting surface at the rear thereof, and means whereby said surfaces are movable into and out of position alined with said focal axis and with said image fixing surface in the focal plane of the camera when said members are in their relative position of far separation, and means whereby said surfaces are moved into and out of their said position with opposite relative movement of said members into their said relative positions.

11. In a photographic camera the combination of a photographic lens carrying member, a focal plane structure member and a third member, said members being relatively movable along the focal axis of the camera, means for effecting positioning of said focal plane member relative to said third member in either of two predetermined positions in their relative movement, a device for viewing through the photographic lens comprising a translucent image fixing surface and a cooperating angularly disposed reflecting surface at the rear thereof, and means whereby said surfaces are movable into and out of position alined with said focal axis and with said image fixing surface in the focal plane of the camera when said focal plane member is in its rearward position with reference to said third member and whereby with said third member in its movement relative to said lens carrying member.

12. In a photographic camera the combination of a photographic lens carrying member, a focal plane structure member and a third member, said members being relatively movable along the focal axis of the camera, means for effecting positioning of said focal plane member relative to said third member in either of two predetermined positions in their relative movement, a device for viewing through the photographic lens comprising a translucent image fixing surface and a cooperating angularly disposed reflecting surface at the rear thereof, means whereby said surfaces are carried by one of said focal plane and third members for movement into and out of position alined with said focal axis and with said image fixing surface in the focal plane of the camera when said focal plane member is in its rearward position with reference to said third member, and means whereby relative movement of said focal plane and third members effects movement of said surfaces into and out of their said position.

13. In a photographic camera the combination of a casing provided with means whereby a selected photographic lens is carried thereby in a predetermined photographing position relative thereof, a focal plane structure member and a third member with said casing and each of which is mounted within the casing for movement independent of the other and relative to the casing along the focal axis of the camera, means for effecting positioning of said focal plane member relative to said third member in either of two positions in their relative movement, a device for viewing through the selected photographic lens comprising a translucent image fixing surface and a cooperating angularly disposed reflecting surface at the rear thereof, and means whereby said surfaces are movable into and out of position alined with said focal axis and with said image fixing surface in the focal plane of the camera when said focal plane member is in its rearward position with reference to said third member and whereby said surfaces are carried in their said position with said third member in its movement relative to said casing.

14. In a photographic camera the combination of a selected photographic lens carrying member, a focal plane structure member, a third member, said members being relatively movable along the focal axis of the camera, a movable adjusting member, means for effecting positioning of said focal plane member relative to said third member in either of two predetermined positions in their relative movement, a movable focusing member, means for effecting focusing movement of said third member with movement of said focusing member and adapted for adjustment to vary said focusing movement to correspond the same with lenses of different focusing characteristics, means for adjusting said last mentioned means, a device for viewing through the photographic lens comprising a translucent image fixing surface and a cooperating angularly disposed reflecting surface at the rear thereof, and means whereby said surfaces are movable into and out of position alined with said focal axis and with said image fixing surface in the focal plane of the camera when said focal plane member is in its rearward position with reference to said third member and whereby said surfaces are carried in their said position with said third member in its movement relative to said lens carrying member.

15. In a photographic camera the combination of a movable focusing member, means for focusing a selected photographic lens with movement of said focusing member and adapted for adjustment to vary the focusing movement, abutment means individual to a selected lens for predeterminately positioning said adjustable means to correspond with the selected lens, and means necessitating positioning of said adjustable means at the extreme of its adjustment separating the same from said abutment means during the positioning of a lens in photographing position.

16. In a photographic camera the combination of a photographic lens seat, releasable means for interchangeably securing a selected photographic lens on said seat, a movable focusing member, means for focusing the seated lens with movement of said focusing member and adapted for adjustment to vary the focusing movement, abutment means individual to and carried by each lens for predeterminately positioning said adjustable means to correspond with the selected lens, and means controlled with said releasable means for operating said adjustable means in a direction away from said abutment means as an incident and prior to release of said releaseable means and for moving said adjustment means into engagement with said abutment means as an incident and subsequent to engagement of said releasable means.

17. In a photographic camera the combination of a photographic lens seat, releasable means for interchangeably securing a selected photographic lens on said seat, a movable focusing member, means for focusing the seated lens with movement of said focusing member and adapted for adjustment to vary the focusing movement, abutment means individual to and carried by each lens for predeterminately positioning said adjustable means to correspond with the selected lens, means comprising a common operating member for operating said adjustable means in a direction away from said abutment means as an incident and prior to release of said releasable means and for moving said adjustment means into engagement with said abutment means as an incident to and subsequent to engagement of said releasable means, an actuating member, means for actuating said operation member from said actuating member in the direction to engage said releasable means comprising a spring connection, an over running clutch and a friction slip connection operating in series, and an abutment operating connection for actuating said operating member from said actuating member in the opposite direction, and means for releasably locking said actuating member in its extreme position in the first mentioned direction.

18. In a photographic camera the combination of a movable focusing member, a focusing movement control member pivoted on an axis normal to the plane of movement of said focusing member, an operative connection between said focusing and control members whereby said focusing member is movable lineally of the control member for effecting the focusing of a selected photographic lens, abutment means individual to a selected lens for predeterminately positioning said control member to correspond with the selected lens, means necessitating positioning of said focusing member, in its movement lineally of said control member, in the region of the pivotal axis of said control member during the positioning of a lens in photographic position, and means necessitating positioning of said control member at the extreme of its pivotal movement separating the same from said abutment means during the positioning of the lens in photographic position.

19. In a photographic camera the combination of releasable means for securing a selected photographic lens in photographing position, a movable focusing member, a focusing movement control member pivoted on an axis normal to the plane of movement of said focusing member, an operative connection between said focusing and control members whereby said focusing member is movable lineally of the control member for effecting the focusing of the selected photographic lens, abutment means individual to a selected lens for predeterminately positioning said control member to correspond with the selected lens, means locking said releasable means against release and operable to permit such release upon positioning of said focusing member, in its movement lineally of said control member, in the region of the pivotal axis of said control member, means controlled with said releasable means and necessitating positioning of said control member at the extreme of its movement separating the same from said abutment means during the positioning of the lens in photographic position, and means controlled with said releasable means for moving said control member into position determined by said abutment means as an incident and subsequent to engagement of said releasable means.

20. In a photographic camera the combination of two relatively movable members for effecting the focusing of a photographic lens, means for adjusting said members in their relative movement including a focusing member pivotally mounted on one of said members on an axis normal to the relative movement of said two members, an actuating member mounted for angular movement on the other of said two members, and an operative connection between said focusing and actuating members including means permitting relative bodily movement of said focusing and actuating members with relative movement of said two members.

21. In a photographic camera the combination of two relatively movable members for effecting the focusing of a photographic lens, of means for adjusting said members in their relative movement including a focusing member pivotally mounted on one of said members on an axis normal to the relative movement of said two members, an actuating member mounted for angular movement on the other of said two members, a gear element on said actuating member, a second gear element having a sliding engagement with said focusing member radially thereof and meshing with said first mentioned gear element, and means operative upon said second gear element for maintaining said gear elements in mesh.

22. In a photographic camera the combination of two relatively movable members for effecting the focusing of a photographic lens, means for adjusting said members in their relative movement including a focusing member pivotally mounted on one of said members on an axis normal to the relative movement of said two members, an actuating member mounted for angular movement on the other of said two members on an axis parallel with the axis of said focusing member, a spur gear element on said actuating member, a spur gear segment having a sliding engagement with said focusing member radially thereof and meshing with said spur gear element for actuation of said focusing member by said actuating member, and spring means operative upon said gear segment to maintain it in mesh with said gear element.

ALBERT S. HOWELL.